United States Patent
Bubley et al.

[11] 3,792,857
[45] Feb. 19, 1974

[54] TAKEOFF APPARATUS

[75] Inventors: Henry J. Bubley, Deerfield; Claude H. Oltra, Chicago, both of Ill.

[73] Assignee: American Screen Printing Equipment Company, Chicago, Ill.

[22] Filed: Aug. 22, 1972

[21] Appl. No.: 282,709

[52] U.S. Cl. .............. 271/85, 101/118, 214/1 BB
[51] Int. Cl. .......................................... B65h 29/10
[58] Field of Search .................. 271/85, 84, 54; 214/1 BB, 8.5 C; 83/153; 101/118, 408

[56] References Cited
UNITED STATES PATENTS

| | | | |
|---|---|---|---|
| 3,233,750 | 2/1966 | Bannon | 214/1 BB |
| 3,436,996 | 4/1969 | Toensing | 83/153 |
| 3,029,957 | 4/1962 | Freeman et al. | 214/1 BB |
| 3,606,308 | 9/1971 | Mowry et al. | 271/53 |

Primary Examiner—Evon C. Blunk
Assistant Examiner—Bruce H. Stoner, Jr.
Attorney, Agent, or Firm—Gomer W. Walters

[57] ABSTRACT

A takeoff apparatus adapted to remove materials from a first location and transfer them to a second location having a frame, a drive means mounted on the frame, a gripper assembly mounted on the frame and connected to the drive means by an arm in such a manner that it is caused to travel reciprocally along the frame between the first and second location and to dwell adjacent the first location a sufficient amount of time to allow fingers on the gripper assembly to properly grip the material to be transferred. A gripper assembly having a pair of spaced parallel shafts, one of the shafts supporting gripper fingers connected by linking means to the other shaft, the linking means being mounted on the second shaft by means allowing a slight amount of play of each gripper finger with respect to the other gripper fingers to assure that all fingers close tightly on the material.

7 Claims, 7 Drawing Figures

PATENTED FEB 19 1974

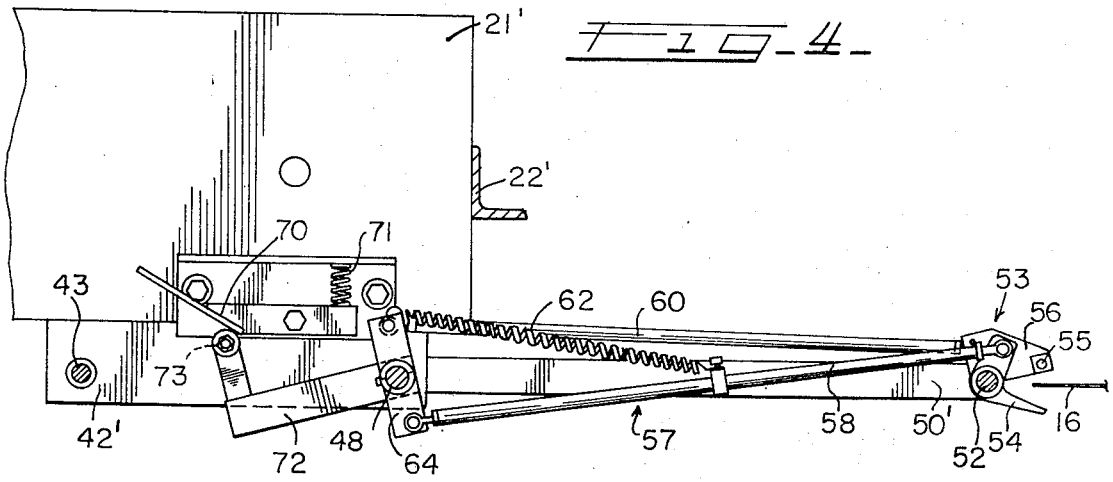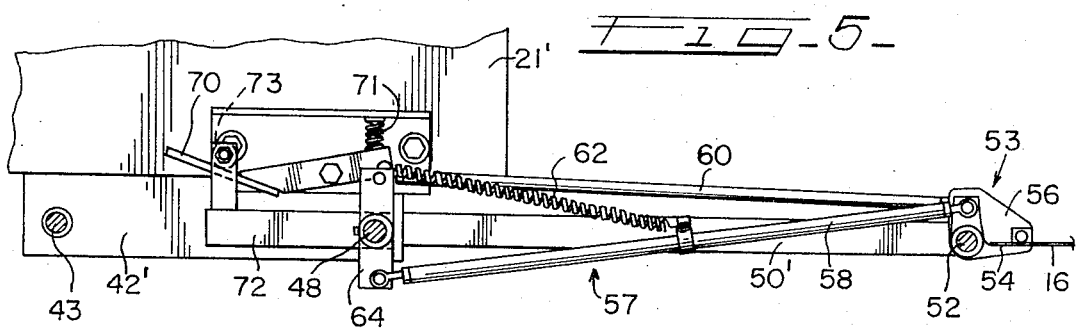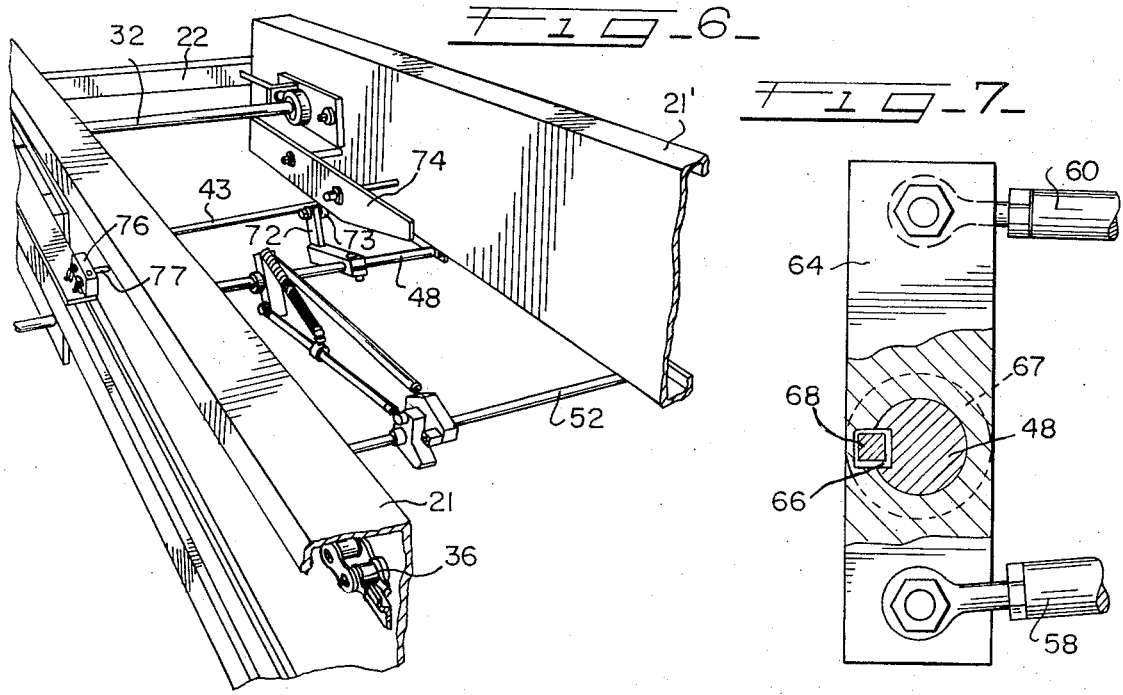

TAKEOFF APPARATUS

BACKGROUND OF THE INVENTION

This invention relates to a takeoff apparatus for transferring materials from a first location to a second location, and, in particular, such an apparatus synchronized with the printing cycle of a screen printing press to transfer printed materials to a drying assembly.

In printing materials, particularly by screen printing methods, it is usually desirable to transfer the web printed stock from the press to an apparatus for drying. It is necessary that such transfer or takeoff remove the stock when the head of the screen printing press is in a raised position so that another piece of stock can be quickly placed on the printing bed for printing. It is also essential that the wet, often extremely heavy stock be transferred quickly and securely to the next operation.

Though often this takeoff operation is performed manually, it is seen that such a method of removing printed stock is neither efficient nor economical in a high production, commercial printing operation. Therefore, automatic machines which operate with the printing cycle of a press have been constructed to remove printed stock. A significant problem is that the weight of printed stock often varies drastically so that it is often difficult for a mechanical gripper to operate on diverse stock and transfer it into proper position with equal effectiveness. It has been found that machines in which a gripper assembly merely reciprocated in constant motion relative to a printing frame often caused misses or partial grips upon the printed stock, causing it to be missed or deposited improperly for the next operation.

One solution to these problems has been to develop a takeoff apparatus having a dwell at the first location or the end of the takeoff adjacent the printing press bed. This dwell causes the gripping fingers to remain at this position for a short interval while the fingers close upon and securely grip the stock before it is removed from the bed to be transferred to the next operation. However, the mechanical devices used to obtain this dwell time have required a number of mechanically complex interrelated pulleys and clutches which have inordinately increased the cost of the takeoff assembly and breakdown problems.

Another problem with present takeoff apparatus appears when it is necessary to use more than one gripper finger to grip and transfer large pieces of stock. The plurality of fingers used normally must be precisely adjusted relative to one another to open and close simultaneously and completely to prevent stock from being misgripped or not gripped at all by one of the gripper fingers. Such precise adjustment is time consuming and re-adjustment is constantly required.

Finally, previous takeoffs, because of their relatively complex construction, have not permitted scaling in size to handle large pieces of stock without remaking of the entire frame and drive means.

DESCRIPTION OF THE INVENTION

The takeoff apparatus of the present invention allows the gripping assembly to remain in suspended motion at the takeoff point adjacent the printing press to assure that the gripper fingers securely grip the stock to be transferred. It also provides a simple means to allow some lost motion or play in the movement of individual gripper fingers to assure complete closure of each on the stock.

This invention overcomes the problems of the prior art and accomplishes these significant advantages by a frame having a drive means including similar, rotatable sprockets mounted on drive shafts disposed near opposite ends of the frame and connected by an endless chain, and a gripper assembly mounted on the frame and being driven in reciprocal movement therealong by the chain. The gripper assembly is operatively connected to the chain by a drive arm having one end attached to the gripper assembly and an opposite end attached to a link on the chain. This drive arm is longer in length than the radius of a sprocket to provide an efficient driving connection, and so that, as the chain and arm are moved about the perimeter of the sprocket near the takeoff point, a point will be reached at which rotational movement of the sprocket through an arc of a few degrees will produce no corresponding linear movement of the gripper assembly along the frame. This suspension of movement achieves the dwell time desired, while the printing head is raised, to allow the gripper fingers of the gripper assembly to properly position and close securely upon the stock to be transferred.

The gripper assembly is mounted on the frame through a pair of spaced plates having roller means riding in spaced channels on opposite sides of the frame. These plates have a cam-follower shaft pivotally mounted therebetween and a substantially parallel gripper finger shaft, fixedly mounted on a cantilevered support arm extending therefrom, on which are mounted a plurality of gripper fingers. The pivotal cam-follower shaft has link arms corresponding to each gripper finger mounted on it, and having their opposite ends connected by rods to the upper and lower jaws of each gripper finger. A cam-follower is mounted on the cam-follower shaft and is movable downwardly upon actuation by cam ramps disposed adjacent the first and second location of the stock to pivot the cam-follower shaft and simultaneously open the jaws of the gripper fingers. The signifcant advantage provided by the gripper assembly described above is that the link arms are mounted on the cam-follower shaft through key slots formed therein which receive under-sized key stock therein. The key stock is intentionally formed with a lesser dimension than the width of the key slot to allow a certain amount of play between the link arm and the shaft. This play provides some lost motion to each gripper finger upon movement of the cam-follower shaft to assure that the jaws of each gripper will completely and securely close upon the stock prior to transfer, despite slight relative misadjustments.

The unique construction of this invention, having driving means mounted outside the frame in constant spaced relationship, allows the shafts of the gripper assembly to be easily extended so that the takeoff apparatus may be scaled in size without remaking the entire frame and drive.

Accordingly, it is an object of this invention to provide a takeoff apparatus which automatically transfers material from a first location to a second location.

It is another object of this invention to provide a takeoff apparatus which is simply constructed and permits easy assembly and expansion.

It is a further object of this invention to provide a takeoff apparatus which assures a brief suspension of movement of the gripping assembly at the location of the stock to be transferred, to permit secure gripping of such stock.

It is also another object of this invention to provide a takeoff apparatus having a geometrical relationship between the gripping assembly drive arm and the driving means which accomplishes a suspension of movement of the gripping assembly relative to the location of the material to be transferred.

It is also one other object of this invention to provide a takeoff apparatus having a plurality of gripping fingers, each of which has a certain amount of play relative to the others to assure that each will completely close upon the stock to be transferred.

It is still another object of this invention to provide a takeoff apparatus whose movements may be easily synchronized with the cycle of a printing press.

These and other important objects of this invention will become apparent from the following description taken in conjunction with the drawings illustrating a preferred embodiment wherein:

FIG. 4 is an elevational view taken generally along the longitudinal axis of the takeoff apparatus in a similar position to that shown in FIG. 3;

FIG. 5 is a fragmentary elevational view taken generally along the longitudinal axis of the takeoff apparatus showing the gripper fingers closed and moving toward the second location;

FIG. 6 is a perspective view of the takeoff apparatus of this invention showing the interior thereof; and, FIG. 7 is a side-elevational, cross-sectional view of the portion of the linking means of the gripper assembly of the takeoff apparatus which assures total closure of each gripping finger.

Figure 1:
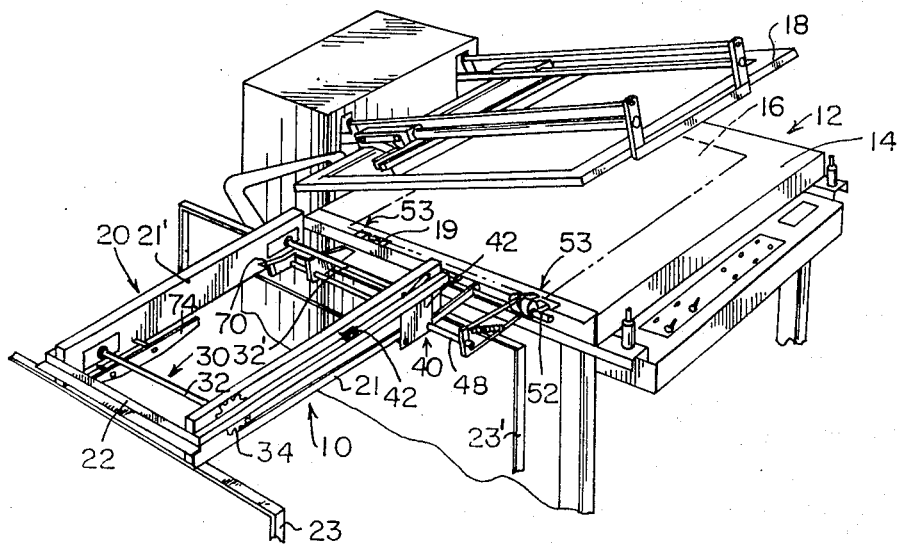
FIG. 1 is a perspective view of the takeoff apparatus of this invention positioned relative to the bed of a screen printing press.

Referring now to the drawings, and, in particular to FIG. 1, the takeoff apparatus of this invention is shown generally at 10. This takeoff 10 is shown positioned adjacent the printing bed 14 of a screen printing press 12. During the printing operation, a press head 18 accomplishes printing on stock 16 placed on bed 14. After printing, the press head 18 pivots away from the bed to allow removal of the stock by takeoff 10.

The takeoff apparatus 10 has a frame 20 which includes oppositely opening support channels 21 and 21' maintained in parallel spaced relationship by similar connecting brackets 22 and 22' disposed on their opposite ends. (Prime numerals are used to indicate similar parts in mirror-image relationship.) The frame 20 is supported above the level of the press bed 14 by U-shaped legs 23 and 23' which are formed so that they will not obstruct the operation of the takeoff. A drive means, generally referred to at 30, is mounted on frame 20, as shown in FIG. 1. Drive means 30 has a pair of parallel, spaced drive shafts 32 and 32' extending between and through support channels 21 and 21' near opposite ends thereof and mounted for rotation with respect thereto. At least one of the drive shafts is operatively connected to a power source (not shown) which will cause it to be rotated about a central axis thereof. Each drive shaft 32 and 32' has mounted, near opposite ends thereof, and adjacent the outside faces of the support channels 21 and 21', sprockets of similar diameter which will each be referred to by the numeral 34. The sprockets 34 which are mounted on opposite ends of the same support channel 21 or 21' are connected for associated movement by endless chains 36 or 36' or equivalent means. Therefore, when the power source (not shown) acts to rotate a drive shaft 32 or 32', movement is imparted to the chains 36 and 36' through the sprockets 34. Thus, the chains 36 and 36' are moved simultaneously and in unison whenever the power source is activated.

The takeoff 10 also has a gripper assembly, indicated generally at 40. This gripper assembly 40 includes support plates 42 and 42' mounted for movement along channels 21 and 21' on a pair of rollers 44 and 44' which ride narrow travel channels 46 and 46', generally co-extensive with support channels 21 and 21', and mounted in fixed relation thereto on brackets 22 and 22'. Support plates 42 and 42' are connected by rod 43 so that they always move in unison. A cam-follower shaft 48 which extends between and through plates 42 and 42' is pivotally movable with respect thereto. Each plate 42 or 42' also has a cantilevered support arm 50 or 50' extending along support channels 21 or 21' mounted on it in the plane of rod 43 and shaft 48. Cantilevered support arms 50 and 50' have a fixed gripping finger shaft 52 extending between and through them and mounted near their forward ends.

Figure 2:
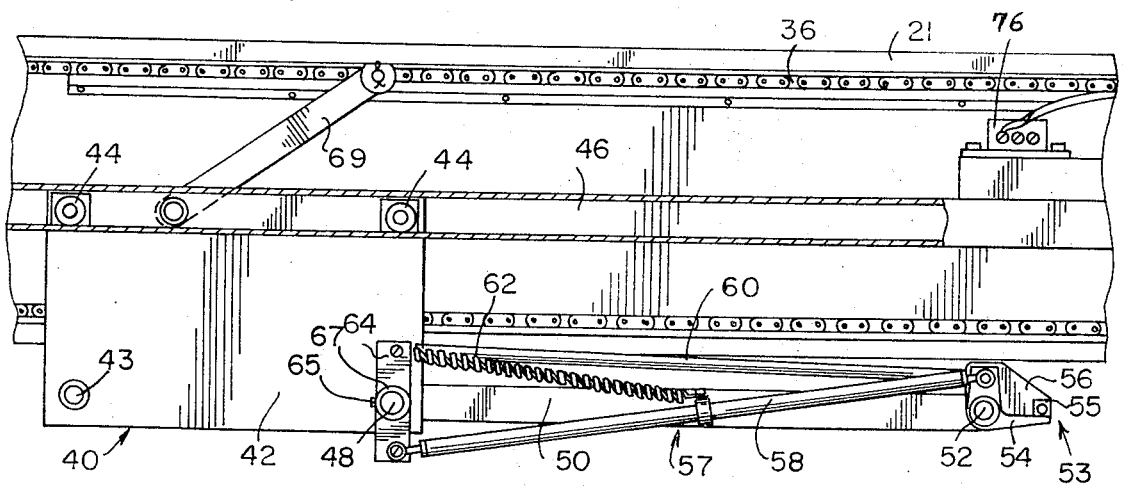
FIG. 2 is a fragmentary side-elevational view of the takeoff apparatus of this invention showing in cut-away the mounting of the gripper assembly on the frame.
Figure 3:
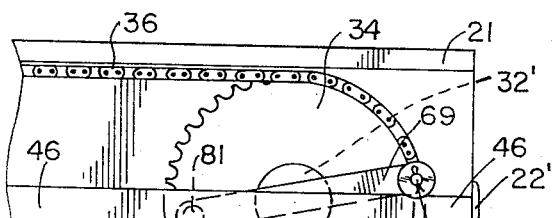
FIG. 3 is a fragmentary side-elevational view of the takeoff apparatus showing the gripper assembly open near the first location.
Figure 3:
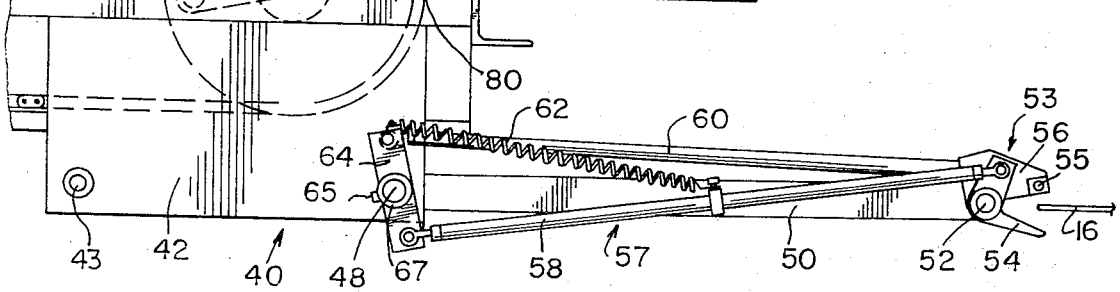

A desired number of gripper finger means 53 are mounted for simultaneous operation on gripper finger shaft 52. Each gripper finger means 53 has a lower gripper jaw 54 and an upper gripper jaw 56 mounted on gripper finger shaft 52 for opposite pivotal movement, as shown in FIGS. 2 and 3. Upper gripper jaw 56 has a toeblock 55 which is freely pivotal with respect to jaw 56 about a central axis. This toeblock 55 acts across the upper surface of lower gripper jaw 54 to provide a broad adjustable gripping surface area.

Each gripping finger means 53 is operatively connected to the pivotal cam-follower shaft 48 by a linking means shown generally at 57. Linking means 57 has a lower gripper jaw rod 58 connected at one end to an upper portion of the lower gripper jaw 54 and an upper gripper jaw rod 60 connected at one end to an upper portion of the upper gripper jaw 56. These rods 58 and 60 extend rearwardly toward the cam-follower shaft 48 and are mounted thereon for operative movement therewith, and cooperative movement with respect to one another, through a generally vertically disposed rod link arm 64, which is joined to shaft 48 for pivotal movement therewith by a means discussed below. Upper jaw rod 60 is connected to the upper portion of link arm 64 and lower jaw rod 58 is connected to its lower portion. A spring biasing means 62 is connected to an upper portion of link arm 64 and extends to a middle portion of lower rod 58 to constantly urge link arm 64 to a vertical position to close gripper jaws 56 and 54, as shown in FIG. 2.

Link arm 64 is maintained in position on cam-follower shaft 48 by holding means 65 inserted through bushings 67 disposed on opposite sides of the link arm 64. The shaft 48 and link arm 64 are formed and positioned to form a key slot 66 having an interior dimension or width slightly greater than the exterior dimension of a key stock 69 inserted therein to operatively join them, as shown in FIG. 7. This sizing discrepancy allows link arm 64 and cam-follower shaft 48 to be relatively rotated to provide some play or lost motion in their movement so that each gripper finger means 53 always closes completely on the stock under the influence of springs 62. This unique link arm mounting eliminates the necessity of constantly aligning each gripping finger means with respect to all other gripping finger means to assure such closure.

The entire gripper assembly 40 is connected for reciprocal movement along the support channels 21 and 21' by uniquely functioning drive arm 69 and 69'. Each drive arm 69 or 69' is pivotally attached at its one end to support plate 42 or 42' and pivotally attached at its opposite end on a pin through a link on chains 36 or 36'.

The novel relationship between the drive arm 69 and 69' and drive means 30 can best be described by reference to a typical operational cycle of the takeoff apparatus 10 as shown in FIGS. 2 through 6.

The takeoff 10 is preferably in electrical communication through a control means or an automatic switch with screen printing press 12. Upon completion of the print stroke of the press cycle, the switch or control will be activated to transmit an electrical signal to the takeoff apparatus thereby activating the power source to engage and rotate a drive shaft 32 or 32'. The rotating drive shaft 32 will cause the chains 36 and 36' to be moved along the channels 21 and 21' and the gripper assembly 40 to be driven toward the first location of the stock, i.e., the press bed 14.

As the gripper assembly 40 is moved toward press bed 14, an L-shaped lever arm 72 having a cam-follower roller 73 mounted on it and joined to shaft 48, as shown in FIG. 4, engages a first or forward cam ramp 70 which is pivotally mounted near the forward end of channel 21'. The projecting roller 73 engages the underside of inclined ramp 70, and is pivoted downwardly thereby with arm 72 around shaft 48 as gripper assembly 40 moves forward. As cam-follower shaft 48 is rotated about its central axis in a counterclockwise direction by lower arm 72, it exerts, through link arm 64, oppositely directed torques on gripper jaws 54 and 56, respectively, which cause these jaws to be opened to receive the stock 16 therebetween.

At this point, the gripper assembly 40 will be in the position generally shown in FIG. 1. Its movement to such a position is synchronized with the movement of the press head 18 away from the press bed 14, to allow removal of the stock 16 without damage to the press head 18.

At approximately this same moment, as shown in FIG. 3, the point 80 at which the drive arm 69 is attached to chain 36 is being moved around sprocket 34. However, the relationship to the length of drive arm 69 to the radius of the sprocket 34 is such that point 80 is moved, at this time, through an arc in which the linear component of each increment of the arc is so small that the pivot point 81 through which the arm 69 is mounted on the plate 42 remains relatively unmoved in a linear direction. Thus, the gripper assembly 40 will be suspended or dwell with the gripper jaws open and positioned above and below the stock for a brief period of time to assure that each gripper jaw will be in proper position to close on and securely grip the stock. The dwell period increases as the length of arm 69 approaches the radius of sprockets 34.

When the point 80 reaches a position on the perimeter of sprocket 34 where the linear component of the arc it is moving through begins to have some significant magnitude, the gripper assembly 40 will be reversed. Prior to this time, however, the roller 73 on the cam-follower lever arm 72 has negotiated the turn from the underside to the top of cam ramp 70 which allows cam shaft 48, by spring 62, to be rotated in the opposite direction to snap jaws 56 and 54 together to securely grip the stock 16. As the cam roller 73 moves up the inclined ramp 70, as shown in FIG. 5, the ramp 70 is pivoted against a spring 71 thereby creating an additional torque on shaft 48 and exerting securing, closing pressure on the gripper fingers.

The entire gripper assembly 40 is then moved rearward toward a second location, such as a conveyor belt leading to a dryer. Near this second location, the lever arm 72 engages a second or rear-inclined cam ramp 74, shown in FIG. 6. As roller 73 moves down the incline, it is again pivoted downwardly on shaft 48 to similarly open the jaws of the gripper fingers. This releases the stock above the second location so that transfer is completed. The gripper fingers remain open as the roller 73 rides along the horizontal edge of the rear cam ramp until the drive arms 69 and 69' have moved around sprockets 34 at the rear end of the channels 21 and 21'. The gripper assembly 40 then moves forward again until it engages a switch arm 77 on a stop switch 76 positioned along the travel channel 46. This de-activates the drive means 30 and positions gripper assembly 40 for activation upon the next press cycle.

All materials used in constructing the frame, gripper assembly and drive means may be any suitable materials which are durable, mechanically reliable, and, in the case of the frame, self-supporting, such as steel, stainless steel, and steel alloys.

The cam-follower shaft 48 and gripper finger shaft 52 are preferably mounted on plates 42 and 42' and arm 50 through suitable bearings on the like which assure good operating relationships and which provide easy assembly and dis-assembly so that these shafts may be extended when it is found necessary to enlarge the spaced separation of the gripper fingers means or to increase the number of gripper finger means 53 to handle larger stock, thereby effectively scaling the size of the takeoff.

It may be desirable to provide a series of aligned cutout portions 19 along the edge of the press bed 14 adjacent the takeoff 10, as shown in FIG. 1, to allow the gripper fingers a better opportunity to grip the stock.

It is clear that the timed-relationship between the drive arm and the sprockets which provides the dwell to assure satisfactory gripping of the stock could also be varied by maintaining the length of the drive arm constant and changing the radius of the sprockets, if this were as easy and economical as simply varying the length of the drive arms. In addition, while it has been set forth that the drive arms are longer in length than the radius of the sprockets, it is clear that dwell would be provided by drive arms having a length equal to the radius of the sprocket. However, the linkage then provided by the drive arm between the chain and the gripper assembly would result in inordinate stresses on these elements and require unnecessarily large torques to drive the takeoff.

Therefore, while the invention has been described in relation to a preferred embodiment thereof, it will be apparent to those skilled in the art that the structural details are capable of wide variation without departing from the principles of the invention.

We claim:

1. In a takeoff apparatus particularly adapted for removing generally flat materials from a first location and transferring them to a second location and including frame means, drive means mounted on said frame means, gripper assembly means mounted on said frame means for movement therealong, said gripper assembly means being operably connected to said drive means to drive said gripper assembly means reciprocally between said first and second locations, said gripper assembly means having a cam-follower shaft movably mounted on said frame means and pivotal with respect thereto, a gripper finger shaft movably mounted on said frame means in generally parallel spaced relationship to said cam-follower shaft, and a plurality of gripper finger means mounted on said gripper finger shaft for pivotal movement with respect thereto to receive and hold said flat materials for transferring the same from said first location to said second location, the improvement including linking means operably connecting said cam-follower shaft and each of said gripper finger means to allow approximately simultaneous opening and closing of said gripper finger means, a portion of said linking means being mounted on said cam-follower shaft in such a manner that it allows complete and independent closing of each of said gripper finger means on the stock to be transferred.

2. The improvement set forth in claim 1 wherein said portion of said linking means connecting each of said gripper finger means with said cam-follower shaft includes link arm means corresponding to each of said gripper finger means and mounted on said cam-follower shaft, each of said link arm means being connected to its corresponding gripper finger means by rod means to allow opening and closing of said gripper finger means, resilient means being connected between each of said link arm means and said corresponding gripper finger means to urge said gripper finger means to a selected position, each of said link arm means being mounted on said cam-follower shaft and being operatively joined to said shaft by key stock means disposed in a key way means formed in said cam-follower shaft and said link arm means, the differential in dimension between said key stock means and said key way means allowing a slight amount of play between said cam-follower shaft and said link arm means, effective to assure complete closure of each gripper finger means on the printed stock.

3. A takeoff apparatus particularly adapted for removing generally flat material from a first location and transferring it to a second location, including frame means, drive means mounted on said frame means, gripper assembly means mounted on said frame means for movement therealong, said gripper assembly means having a cam-follower shaft movably mounted on said frame means and pivotal with respect thereto and a gripper finger shaft movably mounted on said frame means in generally parallel spaced relationship to said cam-follower shaft, a plurality of gripper finger means mounted on said gripper finger shaft for pivotal, opening and closing movement with respect thereto to grip said flat material, gripper actuating cam means mounted on said frame means and disposed for periodic interaction with cam-follower means mounted on said cam-follower shaft of said gripper assembly means, linking means operably connecting said cam-follower shaft and each of said gripper finger means to allow opening and closing of said gripper finger means when said cam-follower shaft engages said gripper actuating cam means during movement of said gripper assembly relative to said frame means, a portion of said linking means being mounted on said cam-follower shaft and having limited movement relative thereto to allow complete closure of each of said gripper finger means, drive arm means having one end connected to said gripper assembly means and an opposite end connected to said drive means, said drive means thereby driving said gripper assembly means reciprocally along said frame means, the geometrical relationship of said drive arm means and said drive means being effective to cause suspension of the movement of said gripper assembly means adjacent said first location of said material a sufficient amount of time to allow each of said gripper finger means of said gripper assembly means to properly grip the material to be transferred.

4. The takeoff apparatus of claim 3 wherein said drive means includes sprocket means mounted on a pair of generally parallel drive shaft means disposed near opposite ends of said frame means, corresponding ones of said sprocket means on each of said drive shaft means being joined by endless chain means, said sprocket means being rotatable with said drive shaft means about a central axis of said drive shaft means to drive said chain means therearound, said drive arm means having one end attached to said chain means for movement therewith about said sprocket means and said opposite end attached to said gripper assembly means to move said gripper assembly means with said chain means reciprocally along said frame means between said first location and said second location of said material.

5. The takeoff apparatus of claim 4 wherein said drive arm means has a length at least slightly greater than the radius of said sprocket means to allow a desired amount of dwell in the movement of said gripper assembly means attached thereto relative to said frame means as said chain means and said attached drive arm means move around the perimeter of said sprocket means to bring said gripper assembly means adjacent said first location of said material, such selected period of dwell thereby assuring that the material is securely gripped by said gripper finger means before the movement of said gripper assembly means is reversed toward said second location.

6. The improvement set forth in claim 3 wherein said frame means includes a pair of horizontally spaced, parallel channel means supporting said drive means and said gripper assembly means, the length of each of said cam-follower shaft and said gripper finger shaft being extendable relative to said frame means either to allow the addition of further gripper finger means and and linking means connecting such gripper finger means to said cam-follower shaft, or to adjust the spacing between each of said gripper finger means and their corresponding linking means, without necessitating any movement or alteration of said channel means or said drive means mounted thereon, thereby providing quick and easy scaling in the size of said takeoff apparatus according to the size and weight of the flat material being transferred.

7. The takeoff apparatus of claim 3 wherein said linking means includes a plurality of link arm means mounted on said cam-follower shaft for movement therewith, rod means connecting each of said link arm means with a corresponding one of said gripper finger means to allow opening and closing of said gripper finger means, upon pivotal movement of said link arm means with said cam-follower shaft, and resilient means connected between said link arm means and said rod means to urge said gripper finger means to a selected position, each of said link arm means being operatively joined to said cam-follower shaft by key stock means disposed in a key way formed in said cam-follower shaft and said link means, said key stock means and said key way having different dimensions to allow a slight amount of play between said cam-follower shaft and said link arm means effective to automatically assure complete closure of each of said gripper finger means on said flat material.

* * * * *